June 12, 1945. W. F. WILHELM 2,378,273
FLUID DISTRIBUTING MECHANISM
Filed Feb. 4, 1943
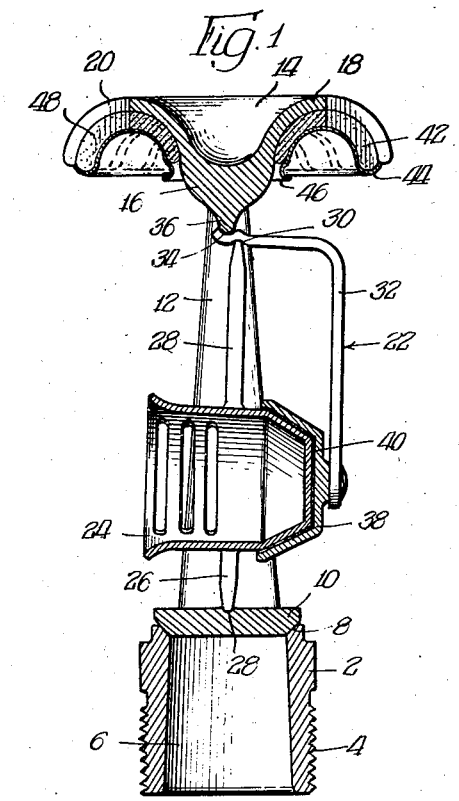
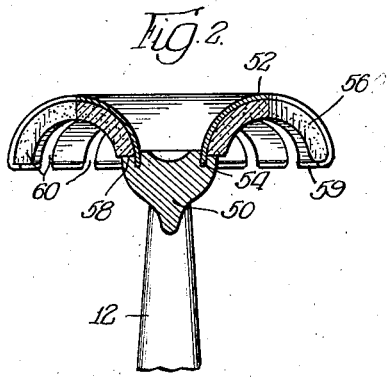
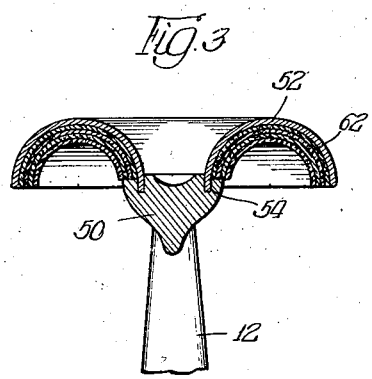
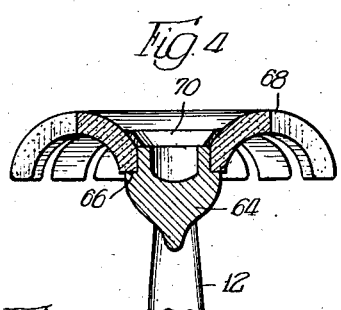
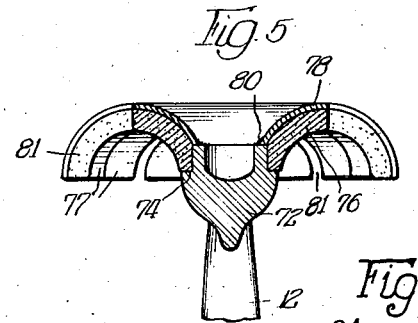
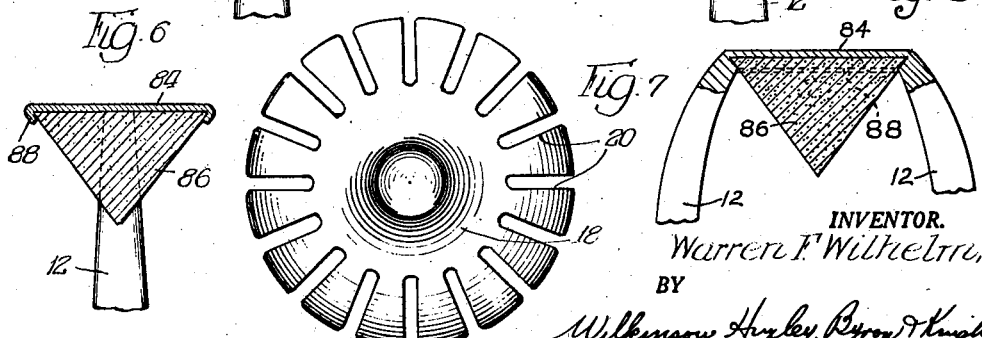
INVENTOR.
Warren F. Wilhelm,
BY Patented June 12, 1945

2,378,273

UNITED STATES PATENT OFFICE 2,378,273

FLUID DISTRIBUTING MECHANISM

Warren F. Wilhelm, Chicago, Ill.

Application February 4, 1943, Serial No. 474,661

11 Claims. (Cl. 169—38)

The present invention relates to fluid distributing mechanisms and more in particular to such devices which have incorporated in their structure, material adapted to be dispersed with the fluid being discharged therefrom.

While it is recognized in the art that various materials may be mixed and dispersed with fluid under pressure, as by way of a nozzle or some other similar mechanism, nevertheless the present invention has to do primarily with the incorporation of such material as an element of the structural assembly and which is available at all times for dispersal with the fluid being discharged therefrom.

Accordingly, it is an object of the present invention to provide a distributor assembly which carries as a part thereof material having the characteristics herein contemplated, and which is so disposed in respect to the fluid flow through the distributor as to be effectively dispersed therewith.

The present invention has as a further object the idea of providing material such as contemplated herein, carried by the distributor and in a form to be progressively available during the fluid flow through said distributor.

The invention further contemplates as an object the idea of incorporating such materials in a fluid distributing device such that the said material acts in the capacity of a deflecting unit in the line of fluid flow so as to be carried by said fluid upon its deflection in the environment of the said distributor.

A further object of the present invention is to provide such material as an element in a fluid distributing structure, in which heat responsive means forms a part thereof for controlling fluid flow through the distributor, and which said material is so disposed in respect to said fluid flow that the same is carried with the fluid in its discharge from the said distributor.

More particularly, the invention comprehends a deflector for a fluid distributor formed with such material, having a plurality of laminae in which each layer of material may be different or of different properties and characteristics.

Still a further object of the present invention is to provide a fluid distributor with a deflector formed from material having the characteristics and properties as contemplated by the invention.

Other objects, features, capabilities and advantages are comprehended by the invention, as will later appear and as are inherently possessed thereby.

Referring to the drawing—

Figure 1 is a longitudinal view in cross-section of a fluid distributor made in accordance with the present invention;

Figure 2 is a fragmentary view in section of a fluid distributor deflector varying in form from that shown in Figure 1 of the drawing;

Figure 3 is a fragmentary view in cross-section of an alternative construction for a fluid distributor deflector;

Figure 4 is a fragmentary view in section of a further form of fluid distributor deflector made in accordance with the present invention;

Figure 5 is a fragmentary view in section of a still further alternative construction for a fluid distributor deflector;

Figure 6 is a fragmentary view in section of still another form of fluid distributor deflector;

Figure 7 is a top plan view of a preferred construction for a deflector element in a fluid distributing device such as shown in the drawing; and Figure 8 is a view in side elevation of the embodiment shown in Figure 6 of the drawing.

Referring now more in detail to the drawing, an embodiment selected to illustrate the present invention is shown in Figure 1 as comprising a sprinkler head having a nozzle 2 screw-threaded externally as at 4 for ready attachment to a conduit or the like connected to a source of fluid under pressure, and which nozzle is formed at the opening of the conduit 6 with a valve seat 8 cooperating with a valve element 10 normally controlling the flow of fluid through the conduit 6. Extending in opposed relation, and upwardly and away from the nozzle 2, are the oppositely disposed arms such as 12 one on each side of the nozzle 2, which, in the illustration as shown in Figure 1, have a deflector head 14 formed integrally therewith. The deflector head 14 is of substantial circular formation as shown in Figure 7 of the drawing, and includes the central body portion 16, the surface thereof in opposed relation to the discharge opening of conduit 6 being of a particular formation to facilitate the lateral dispersion of fluid flowing in the direction thereof and contacting such surface. This central body portion 16 has an annular deflecting portion 18 integrally formed therewith which is of concavo-convex formation, in which the inner surfaces thereof are preferably in streamlined relation to the surface of the central body portion 16. To more effectively disperse fluid striking the deflector head, the deflector portion 18 may be provided with a plurality of slots 20, such as shown in Figure 7, opening in the periphery of the deflector portion 18 and extending radially inwardly toward the body portion 16.

In the particular embodiment illustrative of the present invention and as shown in Figure 1, the valve member 10 is normally held in seating relation with the nozzle 2 by means of heat responsive means 22 comprising a heat collector 24 formed with a strut, the lower end 26 thereof seating within a groove or recess 28 provided in the upper surface of the valve element 10. The strut has its upper end 28 disposed within a notch or groove 30 of a hook 32, which latter element at one end is formed with a notch or depression 34 cooperating with the pivot point 36 forming a part of the central body portion 16. The hook 32 is provided with a cap 38 adjacent its other end fitting over and conforming to the heat collector 24, the two elements, namely the heat collector and cap, being secured by some suitable fusible material 40, such as solder or the like. When fusion of this material takes place the hook 32 springs outwardly and laterally from the heat collector due to the offset bearing relation of the strut 28 and fulcrum point 36, whereby the heat responsive means is rendered inoperative thus permitting the water pressure to unseat the valve 10 and to permit fluid flow in the direction of the deflector head 14.

While Figure 1 is illustrative of one form of valve release means for use in connection with the present invention, it is to be fully understood that the present improvement in the art is adapted for incorporation into or use in assembly with other types of fluid distributing means with alternative forms of valve release mechanism.

The present invention is primarily concerned with providing such a structure as shown in Figure 1 with suitable material represented as 42 and carried by the deflector head 14 within the confines of the deflecting portion 18, which said material is contacted by the fluid and which has the property of being incorporated therewith in the discharge or dispersal of the said fluid from the nozzle. More particularly, the said material 42 may consist of wetting agents, insecticides, surface tension depressing agents, foam producing agents, gas producing agents, water softening agents or, where desired, the said material may be in the form of a suitable soil nutrient should such a nozzle be used in connection with watering systems for lawns and the like. For example, illustrative of suitable wetting agents which can be used, mention may be made of the following:

Amines
Sulfonates
Sulphonic acids
Sulfosuccinic acid and esters (including those products sold under the trade-name of "Aerosol")
Amidines
Aliphatic sulphonic acid derivatives
Fatty acid condensation products
Fatty acid amines The invention is not limited to any particular form in which these materials may be used, but preferably solid forms or semi-solid forms are desirable because of the convenience with which the same may be carried by the deflector head 14. In Figure 1 of the drawing the material is shown as being semi-solid in formation, such as a gelatinous form 42 of material or the like, mounted within the annular confines of the deflector portion 18 and which is preferably enclosed within a covering 44 of an impervious member or the like to prevent deterioration, the inner marginal edge thereof as at 46 being slightly rolled outwardly and radially to facilitate removal thereof by fluid pressure upon flow of fluid through the said distributor. The material 42 is shown as being formed with radial slots 48 which conform substantially to the radial slots 20 of the deflector portion 18 and which may be substantially co-extensive therewith.

In Figure 2 an alternative form of construction for the deflector head is shown as comprising a central body portion 50 to which is secured a deflector 52 within the annular slot 54. As in the embodiment shown in Figure 1, the deflector 52 may be formed with slots 20, and disposed within the annular confines of the said deflector 52 is a material 56 which in this particular embodiment is of solid formation. As is clearly noted in the drawing, the said material 56 has shouldered seating relation with the central body portion 50, as at 58, and has its outer marginal edge confined by the inwardly disposed flange 59 of the deflector 52. This inwardly disposed flange will, after some wear has occurred in the material 56, serve to facilitate greater dispersion of the fluid. Likewise the said material 56 may be formed with slots 60 conforming to the slots of the deflector 52.

As a further illustration of the invention the deflector head may be of the construction shown in Figure 3, which conforms substantially to the structure shown in Figure 2 of the drawing, and including the central head 50 and deflector 52, the said deflector head being mounted in the annular slot 54 of the central body portion. However, in this particular embodiment a body of material 62 consisting of a plurality of layers is employed in which the material of said layers has different properties and characteristics. For example, the materials forming said layers may be different or the material of said layers may be the same but having different properties, such as density, solubility, etc. This particular formation of the material 62 lends itself readily to the formation of an outer layer of relatively hard material which serves as a protective coating to prevent deterioration of the inner layers. As in the previously described embodiments, the deflector 52 and the material 62 may have radially extending slots, but as shown in this particular illustration, no slots are provided. Either of such constructions, however, is within the purview of the present invention.

The present invention further contemplates a structure such as shown in Figure 4 of the drawing, wherein the deflector head is provided with a central body portion 64 having an annular rabbetted part 66 adapted to receive in seating relation therewith a deflector 68 conforming substantially to the deflectors hereinbefore described, and being secured in position by the annular ring 70 secured to the central body 64 in any desired manner. In this embodiment, however, the deflector 68 is formed of any suitable material as hereinbefore illustrated, the same being in solid form and having the property of being slowly dissipated under the action of fluid flow in contact therewith.

The present invention further contemplates an alternative form of construction for the deflector head as illustrated in Figure 5 of the drawing, which comprises a central body portion 72 having the annular rabbetted portion 74 in which seats a deflector 76 of substantially the formation of the previously described deflector elements, but which is of composite construction including a plurality of circumferentially arranged sector-like portions 77 of different materials or of similar material having different properties and selected as desired for their particular properties. In this particular embodiment the deflector 76 is supported in operative position by a reinforcing backing 78 which may be welded or removably secured in any other manner to the central portion of the head as at 80. In this embodiment the material 76 and the backing 78 may be formed with co-extensive radially disposed slots 81 such as exemplified in Figure 7 of the drawing.

By using the construction as shown in Figure 5, materials may be used which are mutually compatible or may be incompatible, and which in cooperative association under the action of the fluid more effectively produce the results desired. For example, where it is desirable to incorporate a wetting agent as a material in this embodiment, certain advantageous results may be secured by using in conjunction therewith some water conditioning material whereby upon fluid flow into contact with the deflector, the wetting agent is rendered more effective than it otherwise would be in the absence of such water conditioning agent.

In addition, it might be desirable to incorporate in the composite structure of the deflector 76, some foam producing agent which, when used in conjunction with the wetting agent and the water conditioning agent, produces additional desired results. Normally incompatible combinations such as alternate masses of acidulous compounds and gas producing materials, such as carbonates, could also be utilized in this invention. Other combinations might be readily assembled to attain the results desired.

Under certain circumstances it may be desirable to provide a deflector conforming to that shown in Figure 6 of the drawing in which a supporting member 84 is connected between the arms 12 and which provides a support for a body of fluid dispersible material 86 of the character herein contemplated. In order to effectuate dispersal of this material with the fluid discharged from conduit 6, the said body of material in this embodiment is in the form of a cone having its apex disposed substantially in line of flow of said fluid. While the said body of material may be secured to the member 84 in any way desired, the particular means disclosed comprises the annular flange 88 which may be formed as a part of said member 84 and which embraces the base portion of the body of material to retain the same in operative position. It is, of course, understood that grooves or openings may be formed in the body of material 86, if desired, to increase the effective dispersal of fluid from the device.

In all of the modifications above described the body of fluid dispersible material is secured in opposed relation to the fluid conduit in association with a support, or a deflector or distributor mounted thereon, in any desired manner, as for example by means of cementitious material, lugs, rivets or the like, so as to serve as the deflecting surface for the fluid body from said conduit until substantially dissipated thereby.

While I have herein described and upon the drawing shown illustrative embodiments of the invention, it is to be understood that the invention is not limited thereto, but may comprehend other constructions, arrangements of parts, details and features without departing from the spirit of the invention.

I claim:

1. A fluid distributor comprising a body portion formed with a fluid conduit having means to connect the conduit with a source of fluid under pressure, means for controlling flow of fluid through said conduit, a deflector of concavo-convex formation operatively associated with the discharge opening of said fluid conduit, a body of fluid dispersible material carried by said deflector whereby said material is distributed with said fluid upon flow thereof through said conduit and means for securing said body of material in association with said deflector until the same is substantially dissipated under the action of said fluid.

2. A fluid distributor comprising a body portion formed with a fluid conduit having means to connect the conduit with a source of fluid under pressure, means for controlling flow of fluid through said conduit, an annular deflector of concavo-convex formation operatively associated with the discharge opening of said fluid conduit, a body of fluid dispersible material carried by said deflector whereby said material is distributed with said fluid upon flow thereof through said conduit and means for securing said body of material in association with said deflector until the same is substantially dissipated under the action of said fluid.

3. A fluid distributor comprising a body portion formed with a fluid conduit having means to connect the conduit with a source of fluid under pressure, means for controlling flow of fluid through said conduit, a body of fluid dispersible material carried by said distibutor, said fluid dispersible material being provided with a plurality of slots and being disposed in associated relation to said conduit whereby said material is distributed with said fluid in deflected relation to said distributor and means for securing said body of material in association with said distributor until the same is substantially dissipated under the action of said fluid.

4. A fluid distributor comprising a body portion formed with a fluid conduit having means to connect the conduit with a source of fluid under pressure, means for controlling flow of fluid through said conduit, a deflector operatively associated with the discharge opening of said fluid conduit, a body of fluid dispersible material carried by said deflector, said deflector and material carried thereby having a plurality of co-extensive slots whereby said material is distributed with said fluid upon flow thereof through said conduit and means for securing said body of material in association with said deflector until the same is substantially dissipated under the action of said fluid.

5. A fluid distributor comprising a body portion formed with a fluid conduit having means to connect the conduit with a source of fluid under pressure, means for controlling flow of fluid through said conduit, an annular deflector of concavo-convex formation operatively associated with the discharge opening of said fluid conduit, a body of fluid dispersible material carried by said deflector, said deflector and material having a plurality of radially extending and substantially co-extensive slots whereby said material is distributed with said fluid upon flow thereof through said conduit and means for securing said body of material in association with said deflector until the same is substantially dissipated under the action of said fluid.

6. A sprinkler head comprising a body portion formed with a fluid conduit having means to connect the conduit with a source of fluid under pressure, valve means having cooperative seating relation with said conduit, deflector means comprising a body of fluid dispersible material disposed in operative associated relation to the discharge opening of said conduit, heat responsive means for controlling said valve means which when rendered inoperative is adapted to initiate fluid flow to said fluid dispersible material whereby said material is distributed with said fluid and means for securing said body of material in association with said deflector until the same is substantially dissipated under the action of said fluid.

7. A sprinkler head comprising a body portion formed with a fluid conduit having means to connect the conduit with a source of fluid under pressure, valve means having cooperative seating relation with said conduit, deflector means comprising a body of material having the properties of a wetting agent disposed in operative associated relation to the discharge opening of said conduit, heat responsive means for controlling said valve means which when rendered inoperative is adapted to initiate fluid flow to said wetting agent whereby said material is distributed with said fluid and means for securing said body of material in association with said deflector until the same is dissipated under the action of said fluid.

8. In a fluid distributor, a deflector comprising a supporting means having a surface for deflecting fluids directed against the same, a body of fluid dispersible material in solid form mounted in association with said supporting means and having a plurality of slots and means for securing said body of material in association with said deflector until the same is substantially dissipated under the action of said fluid.

9. In a fluid distributor, a deflector comprising a support having a surface for deflecting fluids directed against the same, an annular deflector element mounted on said support, a body of fluid dispersible material mounted in association with said deflector element and means for securing said body of material in association with said deflector until the same is substantially dissipated under the action of said fluid.

10. In a fluid distributor, a deflector comprising a supporting means, and a body of fluid dispersible material mounted in association with said supporting means, said body being formed of a plurality of laminae in which the material is of varying characteristics.

11. In a fluid distributor, a deflector comprising a supporting means, and an annular body of fluid dispersible material mounted in association with said supporting means, said body being formed of a plurality of sections of material having different characteristics.

WARREN F. WILHELM.